US011437042B2

(12) United States Patent
    Kim

(10) Patent No.: US 11,437,042 B2
(45) Date of Patent: Sep. 6, 2022

(54) COMMUNICATION ROBOT AND METHOD FOR OPERATING THE SAME

(71) Applicant: LG Electronics Inc., Seoul (KR)

(72) Inventor: Gyeong Hun Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 412 days.

(21) Appl. No.: 16/569,233

(22) Filed: Sep. 12, 2019

(65) Prior Publication Data

US 2020/0005794 A1    Jan. 2, 2020

(30) Foreign Application Priority Data

Jul. 2, 2019    (WO) ................ PCT/KR2019/007989

(51) Int. Cl.
    *G10L 15/22*    (2006.01)
    *G10L 15/32*    (2013.01)
    (Continued)

(52) U.S. Cl.
    CPC .............. *G10L 15/32* (2013.01); *G06V 20/46* (2022.01); *G06V 40/10* (2022.01); *G06V 40/168* (2022.01); *G10L 15/005* (2013.01); *G10L 15/22* (2013.01)

(58) Field of Classification Search
    CPC ........ G06V 20/46; G06V 20/40; G06V 40/16; G06V 40/10; G06V 40/168; B25J 9/16;
    (Continued)

(56) References Cited

U.S. PATENT DOCUMENTS 6,061,646 A * 5/2000 Martino ................ G06F 40/263
                                                    704/3
2018/0277111 A1* 9/2018 Nakagome .............. G10L 25/78
    (Continued)

FOREIGN PATENT DOCUMENTS

JP    2005122128    5/2005
KR    10-0847152 B    7/2008
    (Continued)

OTHER PUBLICATIONS

International Search Report in International Appln. No. PCT/KR2019/007989, dated Mar. 31, 2020, 2 pages.

*Primary Examiner* — Huyen X Vo
(74) *Attorney, Agent, or Firm* — Fish & Richardson P.C.

(57) ABSTRACT

A communication robot capable of communicating with other electronic devices and an external server in a 5G communication environment by performing artificial intelligence (AI) algorithms and/or machine learning algorithms to be loaded and performing a speech recognition, and a driving method thereof are disclosed. The method for driving a communication robot according to an exemplary embodiment of the present disclosure may include receiving an utterance speech uttered by a user who has approached within a predetermined distance from the communication robot, and selecting any one ASR module capable of processing the uttered speech among plural ASR modules as an optimized ASR module. According to the present disclosure, it is possible to improve user's satisfaction with the use of the communication robot by reducing the inconvenience that the user has to manually set a first language in the preprocessing operation in order to receive a service from the communication robot.

18 Claims, 9 Drawing Sheets

(51) Int. Cl.
*G10L 15/00* (2013.01)
*G06V 20/40* (2022.01)
*G06V 40/10* (2022.01)
*G06V 40/16* (2022.01)

(58) Field of Classification Search
CPC ... B25J 11/00; B25J 13/00; B25J 13/08; B25J 11/0005; B25J 9/1679; B25J 11/008; B25J 11/003; B25J 13/003; G10L 15/32; G10L 15/005; G10L 15/00; G10L 15/22; G05B 19/42

See application file for complete search history.

(56) References Cited

U.S. PATENT DOCUMENTS

2018/0357998 A1* 12/2018 Georges ............... G10L 15/14
2019/0371318 A1* 12/2019 Shukla ................. G10L 15/32
2020/0175961 A1* 6/2020 Thomson ............ G06F 21/6245

FOREIGN PATENT DOCUMENTS

| KR | 10-0904191 B | 6/2009 |
| KR | 10-2011-0100620 | 9/2011 |
| KR | 10-1893768 | 9/2018 |
| KR | 10-2018-0130315 | 12/2018 |
| KR | 20190001434 | 1/2019 |

* cited by examiner

FIG. 6A

Pronunciation information : Where is duty free shop?

English language model

| Word | Probability |
|---|---|
| Where | 0.3 |
| is | 0.4 |
| gonghang | 0.00001 |

| Nextword (After 'where') | Probability |
|---|---|
| is | 0.3 |
| are | 0.4 |
| cat | 0.000005 |

FIG. 6B

Pronunciation information : 웨어 이즈 실라 듀티 프리 쇼프

Korean language model

| Word | probability |
|---|---|
| 웨어 | 0.00003 |
| 오늘 | 0.1 |
| 어디 | 0.2 |

| Nextword (After 'where') | probability |
|---|---|
| 이즈 | 0.3 |
| 어 | 0.1 |
| 오늘 | 0.00004 |

COMMUNICATION ROBOT AND METHOD FOR OPERATING THE SAME

CROSS-REFERENCE TO RELATED APPLICATION

This application claims benefit of priority to International Application No. PCT/KR2019/007989, filed on Jul. 2, 2019, the entire disclosure of which is incorporated herein by reference.

BACKGROUND

1. Technical Field

The present disclosure relates to a communication robot and a driving method thereof, and more particularly to a communication robot which automatically sets a language through user's videos and speech recognition without selecting the language of the user who approaches the communication robot, and provides communication information requested by the user using the set language, and a driving method thereof.

2. Description of Related Art

Robots have been developed for industrial use and have been responsible for a part of the factory automation. Recently, as the application field of robots has been further expanded, medical robots, and aerospace robots, etc. have been developed, and household robots that can be used in ordinary homes are also being made.

Patent literature 1 discloses a guidance robot which can search for a destination that a user inputs in a public facility, and guide the user to a destination to conveniently move from a large public facility to a destination desired by the user.

Patent literature 2 discloses a robot guide system in which a user can utilize a touch of a touch sensor attached to the robot, to acquire information about functions of the robot and services provided by the robot.

However, in the case of patent literatures 1 and 2, in order to acquire response information desired by the user, it is necessary for the user to directly input request information to the robot one by one by hand, and in particular, there is a problem that a user whose both hands are not free (for example, when the user has luggage in both hands) is inconvenient to input request information.

The foregoing background art is technical information that the inventor has possessed for derivation of the present invention or acquired in the process of deriving the present invention, and it may not necessarily refer to as a known technology disclosed to the general public prior to the filing of the present disclosure.

Patent literature 1: Korean Patent Registration No. 10-0904191 (registered on Jun. 16, 2009)
Patent literature 2: Korean Patent Registration No. 10-0847152 (registered on Jul. 11, 2008)

SUMMARY OF THE INVENTION

An aspect of the present disclosure is to solve the problems of the prior art in which it was necessary to directly input request information to the robot one by one by hand in order to obtain response information desired by a user, by providing communication information based on the user's speech recognition.

Another aspect of the present invention is to reduce the inconvenience that a user must manually set a language in a preprocessing operation in order to receive a service from a communication robot.

Still another aspect of the present invention is to determine the user's language through an uttered speech recognition of a user located within a certain distance from the communication robot, and perform a speech communication between the user and the communication robot using the user's language.

Other aspect of the present invention is to determine the user's language through an uttered speech recognition of a user located within a certain distance from the communication robot, and perform a visual communication between the user and the communication robot using the user's language.

Other aspect of the present invention is to predict the user's language group through video analysis of the user within a certain distance from the communication robot prior to the user's uttered speech recognition, and quickly process the user's actual language judgements based on the predicted user's language groups.

A method for driving a communication robot according to an embodiment of the present disclosure may include automatically setting a language through the user's video and speech recognition without selecting the language of the user who has approached the communication robot, and provide the communication information requested by the user using the set language.

Specifically, a method for driving a communication robot according to an embodiment of the present disclosure may include the steps of: receiving an utterance speech uttered by a user who has approached within a predetermined distance from the communication robot, and selecting as an optimized ASR (auto speech recognition) module any one ASR module capable of processing the uttered speech among a plurality of ASR modules.

Through the driving method of the communication robot according to the present embodiment, it is possible to improve user's satisfaction with the use of the communication robot by reducing the inconvenience that the user has to manually set the language through preprocessing operation in order to receive services from the communication robot.

Further, the receiving step may include receiving the whole of the utterance speech uttered by the user, and the receiving step may include receiving a part of the whole of the utterance speech uttered by the user.

Through the receiving step according to the present embodiment, a speech communication between the communication robot and the user is performed through a speech recognition regardless of the length of the user's uttered speech, thereby improving user's satisfaction with the use of the communication robot.

In addition, the receiving step may include receiving a first language uttering speech uttered by the user, and the selecting step may include selecting a first language ASR module corresponding to a first language uttered by the user as an optimized ASR module among plural ASR modules.

Through the receiving step and the selecting step according to the present embodiment, a speech communication between the communication robot and the user is performed through a speech recognition of the user's language without inputting the user's special settings, thereby improving user's satisfaction with the use of the communication robot.

Further, a method for driving a communication robot may include the steps of: providing an uttered speech to each of plural ASR modules, and calculating as a score the recognition result of the uttered speech from each of the plural ASR modules, wherein the selecting step may include selecting any one ASR module with the highest score as an optimized ASR module.

Further, the calculating step may include the steps of: acquiring a language-specific correspondence probability possessed by an uttered speech in accordance with the feature of the uttered speech extracted from each of plural ASR modules using an acoustic model, acquiring a placement probability at which respective words are placed at a corresponding position in words that are continued in the uttered speech using a language model, and calculating a language-specific matching score by a combination of the correspondence probability and the placement probability.

The method for driving a communication robot may further include the steps of: receiving a video of a user who has approached within a predetermined distance from the communication robot before receiving the utterance speech uttered by the user, analyzing a video of the user, and setting a predetermined number of candidate ASR modules corresponding to the analysis result of user's video among the plural ASR modules.

Through the steps of receiving, analyzing, and setting the video according to the present embodiment, the user's language group is predicted through a video analysis of the user located within a certain distance from the communication robot before the user's uttered speech recognition, and quickly processing the user's actual language judgment based on the predicted user's language group, thereby improving the performance of the communication robot.

Further, the analyzing step may include analyzing the user's race using one or more of a morphological feature, a measurement feature, a facial index feature, and a cranial index feature from the video of the user.

Further, the selecting step may include selecting as an optimized ASR module any one ASR module capable of processing an uttered speech among a predetermined number of candidate ASR modules corresponding to the user's race.

The communication robot according to an embodiment of the present disclosure may include a receiving module which receives an utterance speech uttered by a user who has approached within a predetermined distance from the communication robot, and a selecting module which selects as an optimized ASR (auto speech recognition) module any one ASR module capable of processing an uttered speech among the plural ASR modules.

Through the communication robot according to the present embodiment, it is possible to improve user's satisfaction with the use of the communication robot by reducing the inconvenience that the user has to manually set the language in the preprocessing operation in order to receive a service from the communication robot.

In addition, the receiving module can receive the whole of the utterance speech uttered by the user, and the receiving module can receive a part of the whole of the utterance speech uttered by the user.

Through the receiving module according to this embodiment, it is possible to improve user's satisfaction with the use of the communication robot by performing a speech communication between the communication robot and the user through a speech recognition regardless of the length of the user's uttered speech.

Further, the receiving module can receive a first language uttering speech uttered by the user, and the selection module can select a first language ASR module corresponding to a first language uttered by the user as an optimized ASR module of the plural ASR modules.

Through the receiving module and the selecting module according to the present embodiment, it is possible to improve user's satisfaction with the use of the communication robot by performing a speech communication between the communication robot and the user through a language speech recognition of the user without inputting the user's special settings.

Further, the communication robot may further include a calculation module that provides an uttered speech to each of plural ASR modules and calculate the recognition results of the uttered speech from each of plural ASR modules as a score, wherein the selection module can select any one ASR module with the highest score as an optimized ASR module.

In addition, the calculation module may acquire a language-specific correspondence probability possessed by the uttered speech in accordance with the features of the utterance speech extracted from each of the plural ASR modules by using an acoustic model, acquire a placement probability at which respective words are placed at the corresponding position in words that are continued in the uttered speech using a language model, and calculate a language-specific matching score by a combination of the correspondence probability and the placement probability.

Further, the communication robot may further include an analysis module that receives and analyzes a video of an user who has approached within a predetermined distance from the communication robot from the receiving module before receiving the utterance speech uttered by the user, and a setting module that sets a predetermined number of candidate ASR modules corresponding to the analysis result of the user's video among the plural ASR modules.

Through the analysis module and the setting module according to the present embodiment, it is possible to improve the performance of the communication robot by predicting a user's language group through a video analysis of the user located within a certain distance from the communication robot before the user's uttered speech recognition, and quickly processing the user's actual language judgment based on the predicted user's language group.

In addition, the analysis module may analyze the user's race using one or more of a morphological feature, a measurement feature, a facial index feature, and a cranial index feature from the user's video.

Further, the selection module may select any one ASR module capable of processing the uttered speech among a predetermined number of candidate ASR modules corresponding to the user's race as an optimizing ASR module.

In addition, another method and another system for implementing the present invention, and a computer programs for carrying out the methods may be further provided.

The foregoing and other aspects, features, and advantages will be better understood from the following detailed description and claims when read in conjunction with the accompanying drawings.

According to an exemplary embodiment of the present disclosure, it is possible to improve user's satisfaction with the use of the communication robot by reducing the inconvenience that the user has to manually set a language in the preprocessing operation in order to receive a service from the communication robot.

In addition, it is possible to improve user's satisfaction with the use of the communication robot by performing a speech communication between the communication robot and the user through a language speech recognition of the user without inputting the user's special settings.

Further, it is possible to improve user's satisfaction with the use of the communication robot by performing a visual communication between the communication robot and the user through a language speech recognition of the user without inputting the user's special settings.

Further, it is possible to improve the performance of the communication robot by predicting the user's language group through the video analysis of the user within a certain distance from the communication robot prior to the user's uttered speech recognition, and quickly processing the user's actual language judgements based on the predicted user's language groups.

Further, the communication robot itself is a mass-produced uniform product, but the user recognizes the communication robot as a personalized device, so that the effect of the user customized product can be realized.

The effects of the present invention are not limited to those described above, and other effects not mentioned can be clearly understood by those skilled in the art from the following description.

BRIEF DESCRIPTION OF THE DRAWINGS

FIGS. 6A and 6B are schematic diagrams illustrating the probability generated by an automatic speech recognition module according to an exemplary embodiment of the present disclosure.

DETAILED DESCRIPTION

Figure 1:
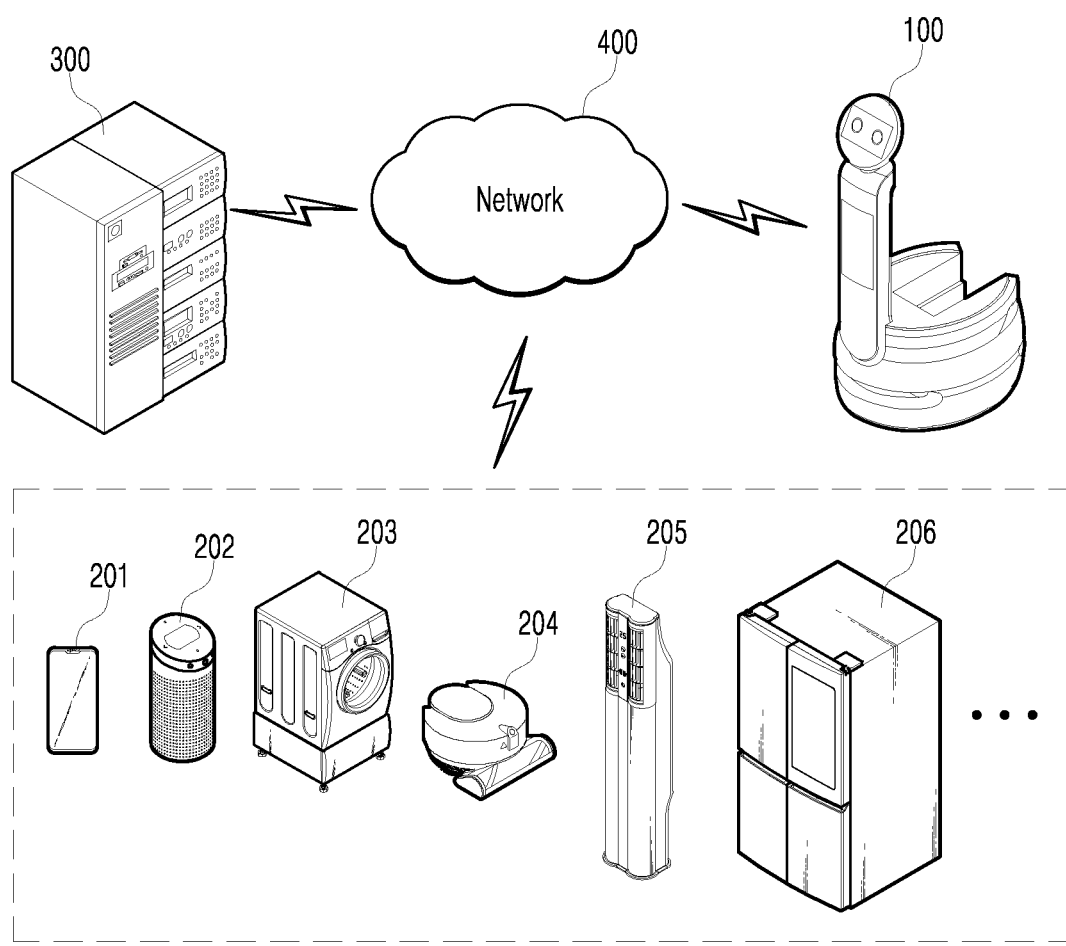
FIG. 1 is an exemplary view of a communication robot-driven environment including a communication robot, an electronic device, a server, and a network for mutually connecting them according to an exemplary embodiment of the present disclosure.

Advantages and features of the present disclosure and methods for achieving them will become apparent from the descriptions of aspects herein below with reference to the accompanying drawings. However, the present disclosure is not limited to the aspects disclosed herein but may be embodied in various different forms, and should be understood to include all modifications, equivalents, and replacements belonging to the concept and the technical scope of the invention. The embodiments set forth herein are provided so that this disclosure will be thorough and complete, and will fully convey the concept of the invention to those skilled in the art. In relation to describing the present disclosure, when the detailed description of the relevant known technology is determined to unnecessarily obscure the gist of the present disclosure, the detailed description may be omitted.

The terminology used herein is for the purpose of describing particular example embodiments only and is not intended to be limiting. As used herein, the singular forms "a," "an," and "the" may be intended to include the plural forms as well, unless the context clearly indicates otherwise. The terms such as "include" and "have" are intended to indicate that features, numbers, steps, operations, elements, components, or combinations thereof used in the following description exist and it should thus be understood that the possibility of existence or addition of one or more other different features, numbers, steps, operations, elements, components, or combinations thereof is not excluded. Although the terms first, second, etc. may be used herein to describe various elements, these elements should not be limited by these terms. These terms may be only used to distinguish one element from another element.

Hereinafter, embodiments according to the present disclosure will be described in detail with reference to the accompanying drawings, and in the description with reference to the accompanying drawings, the same or corresponding components are denoted by the same reference numerals, and the duplicate description thereof will be omitted.

FIG. 1 is an exemplary view of a communication robot-driven environment including a communication robot, an electronic device, a server, and a network for mutually connecting them according to an exemplary embodiment of the present disclosure. Referring to FIG. 1, the communication robot-driven environment 1 may include a communication robot 100, an electronic device 200, a server 300, and a network 400.

The communication robot 100 can perform roles such as patrol, guidance, cleaning, disinfection and transportation in a public place (e.g., an airport, a hospital, a company, etc.). For example, when the communication robot 100 is disposed at an airport, the communication robot 100 can provide an airport route guidance service, a boarding information guidance service, other multimedia contents service, a luggage transportation service, etc. In addition, when the communication robot 100 is disposed in a hospital, the communication robot 100 can provide an intra-hospital route guidance service, a medical office and a hospital room guidance service, and the like.

The communication robot 100 may receive service request information from a user to provide the services described above. The method by which the communication robot 100 receives service request information from the user may include at least one of when receiving a touch signal of a display unit (141 of FIG. 3) from the user, when receiving an uttered speech corresponding to a service request from the user, and/or when generating a photographed video of an operation corresponding to a service request from the user (for example, a gesture that induces the access of the communication robot 100, etc.). Here, the conditions under which the communication robot 100 can receive service request information from the user may include a case where the user approaches within a predetermined distance (e.g., adjacent area 101-1*m* in FIG. 2) from the communication robot 100. The communication robot 100 that has received service request information from the user can generate service response information corresponding thereto, and output service response information through a display unit 141 and/or an audio output unit (142 in FIG. 4). Furthermore, the communication robot 100 can transmit service response information to a user terminal 201.

On the other hand, when a user approaches within a predetermined distance from the communication robot 100 and the communication robot 100 receives an uttering speech corresponding to a service request from the user, the processing result of the uttered speech can be provided as communication information, that is, service response information, through speech recognition processing. Here, the uttered speech can include a language uttering speech of the user, and the communication information may include communication information corresponding to a language uttering speech of the user. For example, if the user's uttered speech is English, the communication information may be English, and if the user's uttered speech is Korean, the communication information may be Korean. Further, in the case where the uttered speech corresponding to a service request from a user is "where is XX duty free shop" in Korean, the communication robot 100 can provide communication information such as "XX duty-free shop is located in . . . " in Korean through speech recognition processing.

Further, the speech recognition processing of the communication robot 100 may use an auto speech recognition (ASR) function. Any one ASR module capable of processing the user's uttered speech among the plural ASR modules (182_1 to 182_N in FIG. 4, for example, English ASR module, Korean ASR module, Japanese ASR module, etc.) can be selected as an optimized ASR module, and the processing result of the uttered speech recognized by the optimized ASR module can be provided as communication information. Thus, in order for the user to receive communication information from the communication robot 100, the step of setting a passive language which has been executed in a preprocessing operation can be omitted, thereby improving user's satisfaction with the use of the communication robot 100.

In an alternative embodiment, in order to more quickly process the user's language determination, before the communication robot 100 receives the uttered speech corresponding to a service request from the user, it may first generate a user's photographed video, analyze the user's photographed video, and predict the user's language group. The communication robot 100 can judge and select the user's actual language group using the predicted user's language group and the user's uttered speech, and provide the speech processing result of the user's uttered speech as communication information.

Further, the communication robot 100 can remotely control various electronic devices 200 through a network 400. Such electronic device 200 may include various electronic devices 200 corresponding to the Internet of Things (IoT), such as a user terminal 201, an artificial intelligent speaker 202 serving as a hub which connects other electronic device 200 to the network 400, a washing machine 203, a robot cleaner 204, an air conditioner 205 and a refrigerator 206. However, examples of the electronic device 200 are not limited to those described in FIG. 1.

Among the electronic devices 200, the user terminal 201 accesses the communication robot-driven application or the communication robot-driven site, and then a service for driving or controlling the communication robot 100 can be provided through an authentication process. The user terminal 201 which has completed the authentication process in this embodiment can drive the communication robot 100 and control the operation of the communication robot 100.

In this embodiment, the user terminal 201 may be desktop computer, smart phone, notebook, tablet PC, smart TV, mobile phone, personal digital assistant (PDA), laptop, media player, micro-server, global positioning system (GPS) device, electronic book terminal, digital broadcasting terminal, navigation, kiosk, MP3 player, digital camera, home appliances and other mobile or non-mobile computing devices which are operated by an user, but is not limited thereto. In addition, the user terminal 201 may be a wearable terminal such as a watch, glasses, a hair band, a ring and the like having a communication function and a data processing function. The user terminal 201 is not limited to the content described above, and a terminal capable of web browsing can be used without limitation.

The server 300 may be a database server that provides big data required for applying various artificial intelligence algorithms and data for operating the communication robot 100. In addition, the server 300 may include a web server or an application server that enable remote control of the operation of the communication robot 100 using a communication robot-driven application or a communication robot-driven web browser installed in the user terminal 201.

Here, artificial intelligence (AI) is an area of computer engineering science and information technology that studies methods to make computers mimic intelligent human behaviors such as reasoning, learning, self-improving, and the like.

In addition, artificial intelligence does not exist on its own, but is rather directly or indirectly related to a number of other fields in computer science. In recent years, there have been numerous attempts to introduce an element of AI into various fields of information technology to solve problems in the respective fields.

Machine learning is an area of artificial intelligence that includes the field of study that gives computers the capability to learn without being explicitly programmed. More specifically, machine learning is a technology that investigates and builds systems, and algorithms for such systems, which are capable of learning, making predictions, and enhancing their own performance on the basis of experiential data. Machine learning algorithms, rather than only executing rigidly set static program commands, may be used to take an approach that builds models for deriving predictions and decisions from inputted data.

The server 300 can receive and analyze service request information from the communication robot 100, and generate communication information corresponding to service request information, that is, service response information, to transmit the generated communication information to the communication robot 100. In particular, the server 300 can receive an uttered speech corresponding to the user's service request from the communication robot 100, generate the processing result of the uttered speech as communication information, that is, service response information, through speech recognition processing, and provide it to the communication robot 100. Here, according to the processing capability of the communication robot 100, it may recognize and process the uttered speech corresponding to the user's service request described above, and generate the processing result as communication information, that is, service response information.

The network 400 may perform a role in connecting the communication robot 100, the output device 200, and the server 300. Such a network 400 may cover wired networks such as LANs (local area networks), WANs (wide area networks), MANs (metropolitan area networks), ISDNs (integrated service digital networks), or wireless networks such as wireless LANs, CDMA, Bluetooth, satellite communication, and the like, but the scope of the present disclosure is not limited thereto. The network 400 may also transmit and receive information using a short-distance communication and/or a long-distance communication. Here, the short-distance communication may include Bluetooth, RFID (radio frequency identification), infrared data association (IrDA), UWB (ultra-wideband), ZigBee, Wi-Fi (wireless fidelity) technologies, and the long-distance communication may include CDMA (code division multiple access), FDMA (frequency division multiple access), TDMA (time division multiple access), OFDMA (orthogonal frequency division multiple access), SC-FDMA (single carrier frequency division multiple access) technologies.

The network 400 may include connections of network elements such as hubs, bridges, routers, switches and gateways. The network 400 may include one or more connected networks, e.g., multiple network environments, including a public network such as the Internet, and a company's private network such as secure enterprise private networks. Access to the network 400 may be provided via one or more wired or wireless access networks. Furthermore, the network 400 may support an Internet of Things (IoT) network and/or 5G communication, which exchanges information between distributed components such as things.

Figure 2:
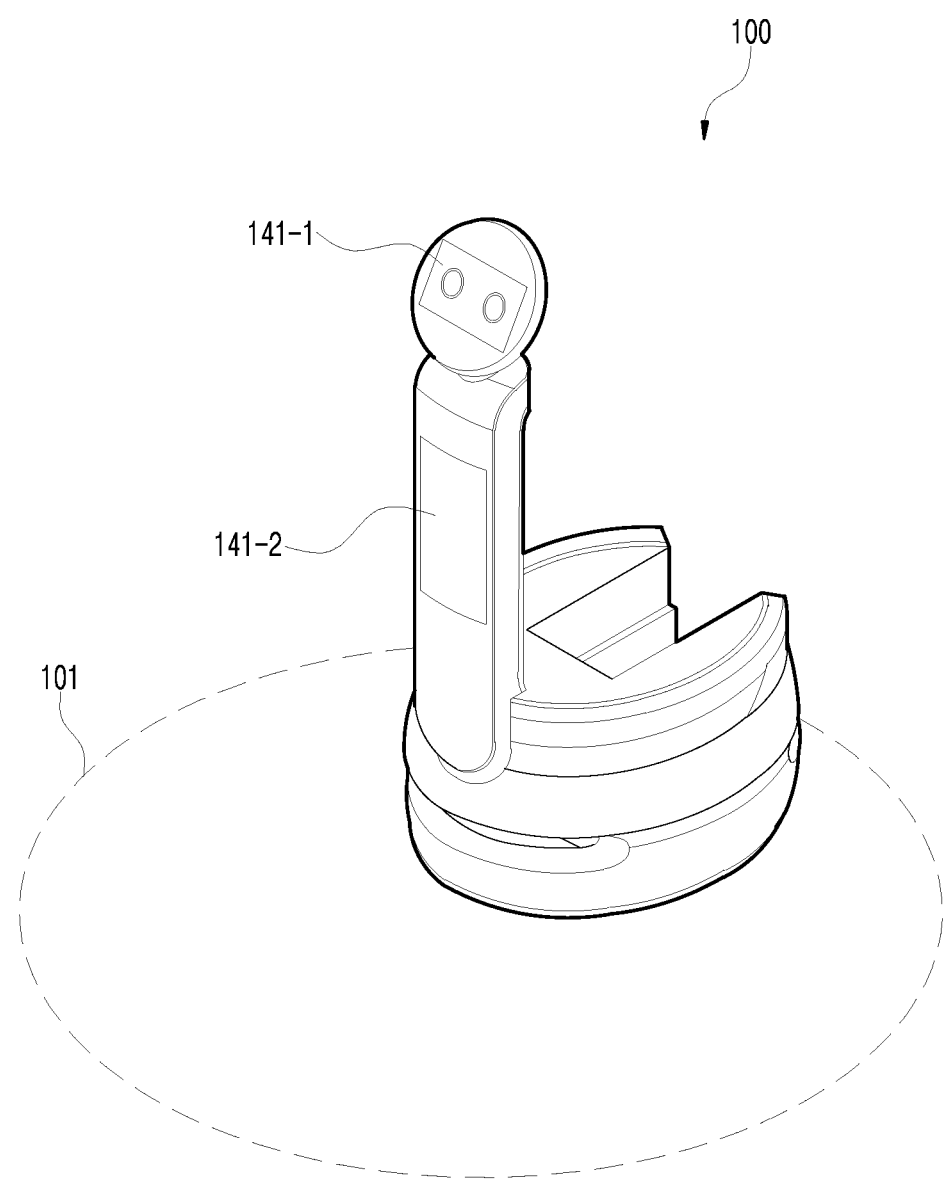
FIG. 2 is a view for schematically explaining the exterior of a communication robot according to an exemplary embodiment of the present disclosure.

FIG. 2 is a view for schematically explaining the exterior of a communication robot according to an exemplary embodiment of the present disclosure. In the following description, a repeated description of portions identical to those described above with reference to FIG. 1 will be omitted.

The communication robot 100 can communicate with a user through emotional communion as eyeline, emotional expression, skinship and the like. When the user strokes the communication robot 100 or the communication robot 100 receives a speech of an user, the communication robot 100 can display various facial expressions such as joy, sadness, anger, and calmness through eyes of a first display unit 141-1, and perform reproduction of various contents and provision of various information (for example, route guidance etc.) through a second display unit 141-2, and remote control of the electronic device 200 through the network 400.

In addition, although not shown in FIG. 2, the first display unit 141-1 and the second display unit 141-2 are each provided with a camera 121, and so it is possible to photograph peripheral videos of the communication robot 100. Further, the back of the body of the robot 100 may include a space (not shown) in which a luggage can be loaded and a space (not shown) in which a user can sit.

Further, as shown in FIG. 2, the communication robot 100 may initiate a specific function when the user approaches within an adjacent area 101. The adjacent area 101 can include, for example, an area 1 m away from the robot. Here, the specific function may include a function for the communication robot 100 to utter a set speech to the user (for example, customer, what can it do for you) or to display a happy face through the eyes of the first display unit 141-1, or a function of reproducing a set content via a second display unit 141-2. Further, the judgement of access to the adjacent area 101 for the user may use distance information calculated using information (for example, an infrared sensor, an ultrasonic sensor) detected by a sensing unit (130 in FIG. 3) described later.

Figure 3:
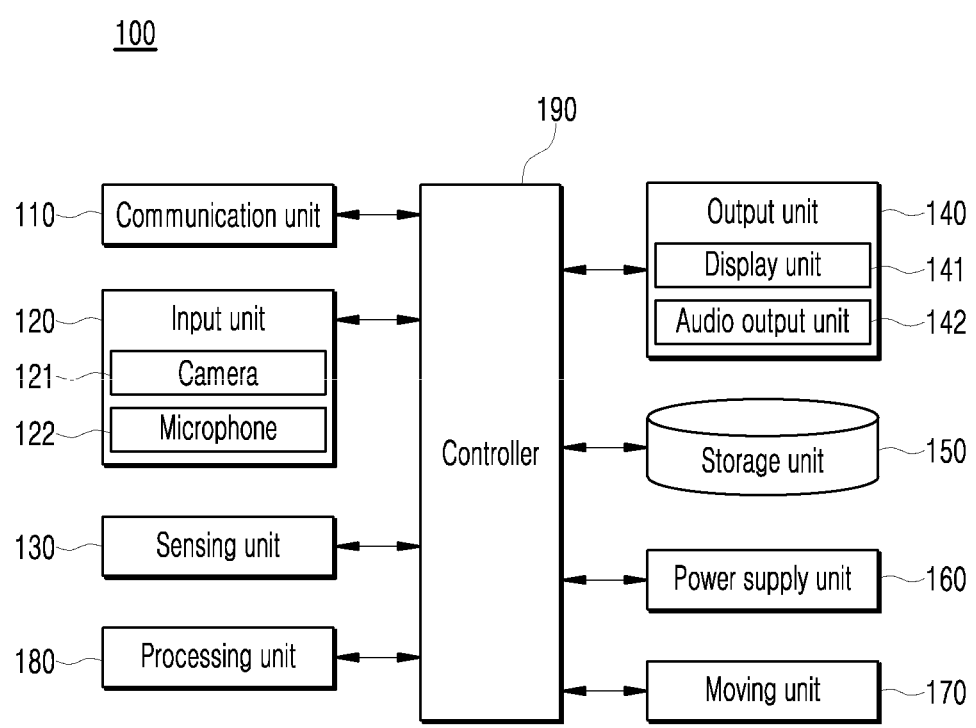
FIG. 3 is a schematic block diagram of a communication robot according to an exemplary embodiment of the present disclosure.

FIG. 3 is a schematic block diagram of a communication robot according to an exemplary embodiment of the present disclosure. In the following description, a repeated description of portions identical to those described above with reference to FIG. 1 will be omitted. Referring to FIG. 3, the communication robot 100 may include a communication unit 110, an input unit 120, a sensing unit 130, an output unit 140, a storage unit 150, a power supply unit 160, a moving unit 170, a processing unit 180, and a controller 190.

The communication unit 110 can provide a communication interface required to provide transmission/reception signals between an electronic device 200 and/or a server 300 in the form of packet data in cooperation with a network 400. Further, the communication unit 110 can support various kinds of machine-to-machine communications (IoT (internet of things), IoE (internet of everything), IoST (internet of small things), etc.) and support M2M (machine to machine) communication, V2X (vehicle to everything communication) communication, D2D (device to device) communication, and the like.

The input unit 120 may include a camera 121 capable of receiving a video signal and a microphone 122 capable of receiving an audio signal input. The camera 121 can photograph peripheral videos according to a driving mode and/or a driving state of the communication robot 100 under the control of the controller 190, and a plurality of cameras 121 can be installed for photographing efficiency. For example, the camera 121 may be installed on a first display unit 141-1 and a second display unit 141-2, and thus may not be visible in appearance. Such camera 121 may include an image sensor (e.g., a CMOS image sensor) configured to include at least one optical lens and multiple photodiodes (e.g., pixels) that are imaged by light passing through an optical lens), and a digital signal processor (DSP) (not shown) that forms a video based on signals output from photodiodes. The camera 121 can generate a still video and also a moving video including frames composed of the still video. On the other hand, a video photographed and acquired by the camera 121 can be stored in a storage unit 150. In the present embodiment, the camera 121 can photograph peripheral videos of the communication robot 100, and it is possible to photograph the full body videos of the user in order to set one or more candidate ASR modules among the plural ASR modules (182_1 to 182_N in FIG. 4).

A microphone 122 can input an utterance speech uttered by the user toward the communication robot 100 under the control of a controller 190. In addition, a plurality of microphones 122 may be provided to more accurately receive a user's uttered speech. Here, each of the plurality of microphones can be disposed apart from each other at a different position, and process the received user's uttering speech as an electrical signal. Here, the input unit 120 may use various noise removal algorithms to remove noise generated in the process of receiving a user's uttered speech. In an alternative embodiment, the input unit 120 may include various components for processing a speech signal, such as a filter (not shown) for removing noise when receiving a user's uttered speech, an amplifier (not shown) for amplifying and outputting the signal output from the filter.

In an alternative embodiment, the input unit 120 may include a user input unit (not shown, touch key, mechanical key, etc.) which receives information from a user in connection with the setting of the drive mode.

For example, the input unit 120 may include first to fourth contact switches (not shown), and how the output signals of respective contact switches are processed can be determined by a program stored in a storage unit 150. For example, menus displayed in the left or right direction on the second display unit 141-2 may be selected according to the operation signals of the first contact switch or the second contact switch, and menus displayed upward or downward on the second display unit 141-2 may be selected according to the operation signals of the third contact switch or the fourth contact switch. Further, when one of the first to fourth contact switches is operated, the speech recognition function can be activated.

A sensing unit 130 may include at least one sensor for sensing at least one of information in the communication robot 100, peripheral environment information surrounding the communication robot 100, and user information. For example, the sensing unit 130 may include at least one of an obstacle sensor (e.g., proximity sensor, Lidar sensor, etc.), a weight detection sensor, an illumination sensor, a touch sensor, an acceleration sensor, a magnetic sensor, a gravity sensor (G-sensor), a gyroscope sensor, a motion sensor, a RGB sensor, an infrared sensor (IR sensor), a finger scan sensor, an ultrasonic sensor, an optical sensor (e.g., camera 121), a microphone (see 122), a battery gauge, an environmental sensor (e.g., barometer, hygrometer, thermometer, radiation detection sensor, heat detection sensor, gas detection sensor, etc.), and a chemical sensor (e. g., electronic nose, health care sensor, biometric sensor, etc.). Meanwhile, in the present embodiment, the communication robot 100 can combine and utilize information sensed by at least two of the above-mentioned sensors.

An output unit 140 can output information related to the operation of the communication robot 100 as a visual data, an auditory data, a tactile data, or the like, and may include a display unit 141, an audio output unit 142, and a haptic output unit (not shown). In this embodiment, the display unit 141 may include a first display unit 141-1 and a second display unit 141-2 as shown in FIG. 2.

The display unit 141 can output information related to the operation of the communication robot 100 as a visual data, and may be realized as a touch screen (not shown) by forming a mutual layer structure with the touch sensor or being integrally formed. Such touch screen can function as a user input unit that provides an input interface between the communication robot 100 and the user, and at the same time, provide an output interface between the communication robot 100 and the user.

An audio output unit 142 can output information related to operation of the communication robot 100 as an audio data, and under the control of the controller 190, a notification message such as a warning sound, an operation mode, an operation state, an error state, and the like, information corresponding to the user's speech command, processing results corresponding to the user's speech command can be output as an audio. The audio output unit 142 can convert the electrical signal from the controller 190 into an audio signal and output it. Therefore, a speaker (not shown) or the like can be provided.

A storage unit 150 may store data supporting various functions of the communication robot 100. The storage unit 150 may store a plurality of application programs or applications driven by the communication robot 100, and data and commands for the operation of the communication robot 100. At least some of these application programs may be downloaded from an external server via wireless communication.

The storage unit 150 stores a wake-up word speech that can drive the communication robot 100. Thus, when the user utters a wake-up word speech, the processing unit 180 can recognize this and change the communication robot 100 which was in an inactive state into that in an activated state. Further, the storage unit 150 may store task information and the like to be performed by the communication robot 100 in response to a user's voice command (for example, an uttered speech for calling the communication robot 100).

In the present embodiment, the storage unit 150 can perform a function of temporarily or permanently storing data processed by the controller 190. Here, the storage unit 150 may include a magnetic storage media or a flash storage media, but the scope of the present invention is not limited thereto. Such storage unit 150 may include an internal memory and/or an external memory, and may include a volatile memory such as DRAM, SRAM, or SDRAM, a nonvolatile memory such as OTPROM (One Time Programmable ROM), PROM, EPROM, EEPROM, mask ROM, flash ROM, NAND flash memory, or NOR flash memory, a flash drive such as SSD, compact flash (CF) card, SD card, Micro-SD card, Mini-SD card, Xd card, or memory stick, or a storage device such as a HDD.

Under the control of the controller 190, a power supply unit 160 can receive external power and internal power to supply power to respective components of the communication robot 100. Such power supply unit 160 may include a battery, and the battery may be comprised of an internal battery or a replaceable battery. The battery may be charged by a wired or wireless charging system, and the wireless charging system may include a magnetic induction system or a self-resonance system. In this embodiment, the battery may include a rechargeable secondary battery such as a nickel-cadmium battery, a lead storage battery, a nickel metal hydride battery (NiMH), a lithium ion battery, and a lithium polymer battery, but is not limited thereto.

In this embodiment, the controller 190 can control charging and discharging of the battery, and monitor state information of the battery to protect the battery. For example, the controller 190 may perform an overcharge protection function, an overdischarge protection function, an overcurrent protection function, an overvoltage protection function, an overheat protection function, and a cell balancing function, and the like of the battery. Further, the controller 190 can acquire a current, a voltage, a temperature, a residual power, a life, a state of charge (SOC), and the like of the battery. For example, although not shown, the controller 190 may measure the voltage and temperature of the battery using a sensing unit 130. When detecting that abnormal circumstances such as overcharge, overdischarge, overcurrent, or high temperature of a battery have occurred, the controller 190 can control charging and discharging of the battery to protect the battery.

A moving unit 170 includes a plurality of wheels (not shown), and may move and/or stop according to the operation mode and/or the operation state of the communication robot 100. The controller 190 may control the direction, movement and/or stop of the plurality of wheels. In an alternative embodiment, the controller 190 operates one or more of the plurality of wheels in response to the gesture of the user or the speech of the user, thereby allowing the communication robot 100 to move to an arbitrary place (for example, near the user).

When a user approaches within a predetermined distance (adjacent area 101) from the communication robot 100 and the processing unit 180 receives an uttered speech corresponding to a service request from a user, a series of processes can be performed to provide the processing result of the uttered speech as communication information, that is, service response information, through the speech recognition process. The processing unit 180 can use an automatic speech recognition function for speech recognition processing. Further, in order to process the language judgment of the user more quickly, the processing unit 180 can generate a photographed video of the user before receiving an uttered speech corresponding to a service request from the user, and analyze the photographed video of the user to predict a language group of the user. The communication robot 100 can judge and select the user's actual language by using the user's predicted language group and the user's uttered speech received later, and provide communication processing information of the user's uttered speech as communication information. In the present embodiment, the processing unit 180 may be provided outside the controller 190 as shown in FIG. 3, and provided inside the controller 190 and operate like the controller 190, or may be provided inside the server 300 of FIG. 1. Hereinafter, the details of the processing unit 180 will be described with reference to FIGS. 4 and 5.

The controller 190 can control the entire operation of the communication robot 100 by driving a control software installed in a storage unit 150 as a kind of central processing unit. In this embodiment, in order to select any one ASR module capable of processing a user's uttered speech among the plural ASR modules (182_1 to 182_N in FIG. 4), the controller 190 can generate an optimized ASR module selection algorithm by allowing the ASR module selection algorithm to learn using user's video information and user's speech information as a training input data. Thereafter, when user's video information and user's speech information are received, the optimized ASR module selection algorithm can be executed to select the optimized ASR module.

Here, the controller 190 may include all types of devices capable of processing data, like a processor. Here, the 'processor' may refer to a data processing device built in a hardware, which includes physically structured circuits in order to perform functions represented as a code or command present in a program. Examples of the data processing device built in a hardware include, but are not limited to, processing devices such as a microprocessor, a central processing unit (CPU), a processor core, a multiprocessor, an application-specific integrated circuit (ASIC), a field programmable gate array (FPGA), and the like.

In this embodiment, the communication robot 100 can perform machine learning such as deep learning for the selection of the ARS module, and the storage unit 150 may store data used for machine learning, result data, and the like.

Deep learning, a type of machine learning, can be learned up to a deep level in multiple stages based on the data. The deep learning can represent a set of machine learning algorithms that extract key data from a plurality of data as the stage increases.

Deep learning structures may include an artificial neural network (ANN). For example, the deep learning structures may be composed of a deep neural network (DNN) such as a convolutional neural network (CNN), a recurrent neural network (RNN), a deep belief network (DBN), and the like. The deep learning structure according to the present embodiment may use various structures well known in the art. For example, the deep learning structure according to the present disclosure may include a CNN, an RNN, a DBN, and the like. RNN is an artificial neural network structure which is formed by building up layers at each instance, and which is heavily used in natural language processing and the like and effective for processing time-series data which vary over a course of time. A DBN includes a deep learning structure formed by stacking up multiple layers of restricted Boltzmann machines (RBM) which is a deep learning scheme. A DBN has the number of layers formed by repeating RBM training. A CNN includes a model mimicking a human brain function, built under the assumption that when a person recognizes an object, the brain extracts the most basic features of the object and recognizes the object based on the results of complex processing in the brain.

Meanwhile, the artificial neural network can be trained by adjusting connection weights between nodes (if necessary, adjusting bias values as well) so as to produce desired output from given input. Also, the artificial neural network can continuously update the weight values through learning. Furthermore, methods such as back propagation may be used in training the artificial neural network.

On the other hand, the communication robot 100 may be equipped with an artificial neural network, and when the user approaches within the adjacent area 101 of the communication robot 100, the user's video information and the user's speech information are acquired, which are used as a training input data and are allowed to learn the ASR module selection algorithm to generate an optimized ASR module selection algorithm. Subsequently, when the user's video information and the user's speech information are received, the ASR module selection and speech processing based on the machine learning can be performed so that the optimized ASR module selection algorithm is executed to select the optimized ASR module.

The controller 190 may include an artificial neural network, for example, a deep neural network (DNN) such as CNN, RNN, DBN, etc. and learn a deep neural network. As a machine learning method of such artificial neural network, both unsupervised learning and supervised learning can be used. After learning according to the setting, the controller 190 can control so as to update the tone recognition artificial neural network structure after learning.

Figure 4:
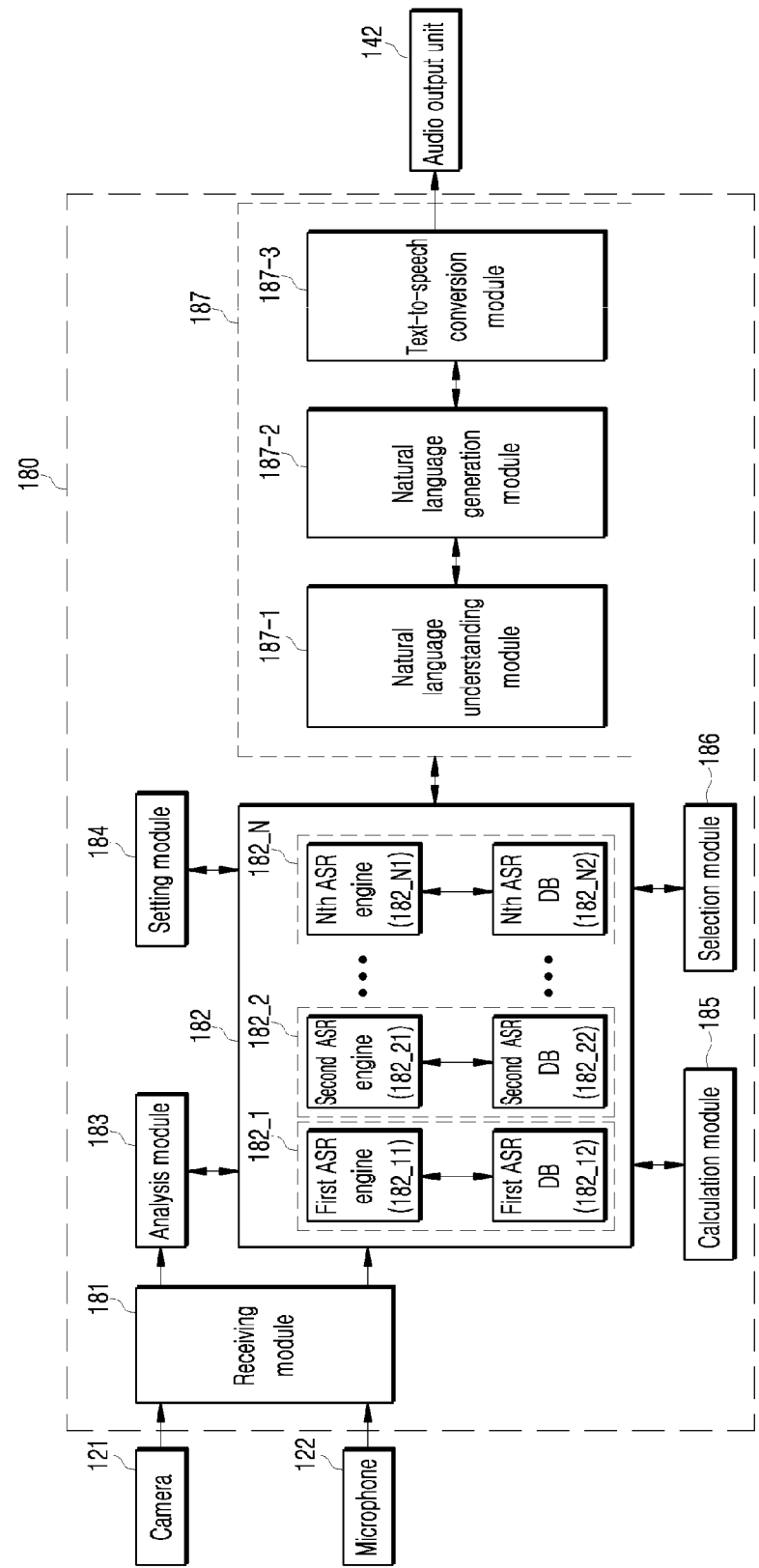
FIG. 4 is a schematic block diagram of the processing unit in FIG. 3.

FIG. 4 is a schematic block diagram of the processing unit in FIG. 3. In the following description, a repeated description of portions identical to those described above with reference to FIGS. 1 to 3 will be omitted. Referring to FIG. 4, the processing unit 180 includes a receiving module 181, an automatic speech recognition module 182, an analysis module 183, a setting module 184, a calculation module 185, a selection module 186, and a providing module 187.

The receiving module 181 may receive user-related information in which the user approaches within a predetermined distance (adjacent area 101) from the communication robot 100. Here, the user-related information may include a user's video photographed by a camera 121 and a user's uttered speech input to a microphone 122. In this embodiment, the receiving module 181 can first receive the user's video and then receive the user's uttered speech, but the order thereof is not limited to the content described above. In an alternative embodiment, the receiving module 181 can first receive the wake-up-word (e.g., Airstar) included in the user's uttered speech to activate the communication robot 100. After the user's video information and the wake-up-word speech, the user can utter to receive continuous words included in the user's uttered speech. From this, the user's uttered speech may include a wake-up-word speech and a continuous speech. In an alternative embodiment, the receiving module 181 may receive the whole of the uttered speech for the continuous speech uttered by the user, or may receive a part of the whole of the uttered speech for the continuous speech uttered by the user. Further, the utterance speech uttered by the user may be a first language (e.g., native language).

The automatic speech recognition (ASR) module 182 may convert the user's uttered speech (wake-up-word speech and continuous speech) received by the receiving module 181 into a text data. In the present embodiment, the automatic speech recognition module 182 may include a first automatic speech recognition (ASR) module 182_1 to an Nth automatic speech recognition (ASR) module 182_N. The user's uttered speech received by the receiving module 181 is input to the first ASR module 182_1 to the Nth ASR module 182_N, and the first ASR module 182_1 to the Nth ASR module 182_N may convert the user's uttered speech into text data. Here, each of the first ASR module 182_1 to the Nth ASR module 182_N may process different languages. For example, the first ASR module 182_1 may convert the input speech uttered by the user into English text data, the second ASR module 182_2 may convert the input speech uttered by the user into Korean text data, and the third ASR module 182_3 can convert the input speech uttered by the user into Japanese text data. Here, each of the first ASR module 182_1 to the Nth ASR module 182_N may simultaneously receive the user's uttered speech and operate in parallel.

In this embodiment, each of the first ASR module 182_1 to the Nth ASR module 182_N may include an ASR engine and an ASR DB. That is, the first ASR module 182_1 may include a first ASR engine 182_11 and a first ASR DB 182_12, and the Nth ASR module 182_1N may include an Nth ASR engine 182_N1 and an Nth ASR DB 182_N2. Each of the first ASR module 182_1 to the Nth ASR module 182_N may extract a feature vector from the input speech uttered by the user and calculate the text data and probability for each language by using the acoustic model and the language model. The detailed operation of the first ASR module 182_1 to the Nth ASR module 182_N will be described with reference to FIG. 5.

The analysis module 183 may analyze the user's video from the receiving module 181. Here, the analysis module 183 can analyze the user's video, and generate the user's race information as a result of the analysis. The analysis module 183 may generate race information of the user using one or more of a morphological feature, a measurement feature, a facial index feature, and a cranial index feature from the user's video. Here, the morphological feature may include skin color (white, yellow, black, etc.), hair shape and color, and pupil color (blue, black, gray, etc.). The measurement feature may include the height, up, down, left and right lengths of face, nose length and shape, and the like. The facial index feature may include forehead width, *glabella* distance, philtrum distance, and the like. The cranial index feature may include skull morphology information.

The storage unit 150 stores reference values capable of classifying the user's race, the analysis module 183 can compare the reference value stored in the storage unit 150 with the user's video to generate the analysis result of the race and distribution area of the user, and the user's language prediction result can be generated as an analysis result from the distribution area.

Currently, the world's races are divided into five major races, such as Asia, Europe, Africa, America, and Malay. Looking at their distribution area, Caucasian is distributed throughout Europe, North Africa, the Arabian Peninsula, Afghanistan, North India, North South America, etc. The skin is white but some is brown, and they have features such as wide forehead, high nose, masthead, wavy hair, bluish brown or black eyes, many body hairs, etc. The height is tall or medium, and about 2 billion people (57% of the total population) is distributed. Mongolian is distributed in East Asia, Mongolia, East Siberia, Indochina, South-West Asia, Asia Minor, Central Asia, Hungary, Finland, and the like, and the skin is mainly yellow but some are pale brown, and they have features such as wide forehead, low nose, brachycephaly, black straight hair, less body hair, and the like. The height is medium or short, and about 1.5 billion people (33% of the total population) are distributed. Negro is distributed in the south of central Africa, the United States and the like, and the skin is bronze light and dark brown, and they have features such as thick lips, low nose, masthead, coriander head, black eyes, less body hair. The height is tall or medium, and about 270 million people (7% of the total population) are distributed. North and South American mixed race (brown) is distributed in North America, South America, the Arctic Ocean coast, and the skin is copper light or brown. Hairs and eyes are similar to Asian race, and about 15 million people are distributed. Malay is distributed in Indonesia, Philippines, New Guinea, Melanesia, etc., and the skin is brown. The others are similar to Asian race, and about 140 million people (3% of the total population) are distributed. Polynesian are ethnic groups that live in the Pacific Islands, such as Hawaii, Guinea, West Samoa, Quam, and the like, and the skin is brown and the skull is large and the body shape is large, and about 15 million people are distributed.

The setting module 184 may set a predetermined number of candidate ASR modules from the first ASR module 182_1 to the Nth ASR module 182_N using the analysis result of the analysis module 183. Here, the number of the candidate ASR modules may be equal to the number of languages predicted from the race and distribution area of the user, which is the analysis result of the analysis module 183. For example, if the analysis result of user's video of the analysis module 183 is white (Caucasian), the setting module 184 may set a predetermined number of candidate ASR modules (e.g., English ASR module, French ASR module, Spanish ASR module, Portuguese ASR module, etc.), considering that the distribution area is throughout Europe, North Africa, Arabian Peninsula, Afghanistan, North India, and North and South America. When the setting module 184 completes the setting of the predetermined number of candidate ASR modules in this way, the user's uttered speech is activated in a predetermined number of ASR modules corresponding to candidate ASR modules of the first ASR module 182_1 to the Nth ASR module 182_N, and the ASR module excluded from candidate ASR modules may be in the operation standby state.

The calculation module 185 can calculate the recognition result of the user uttered speech as a score, from each of a predetermined number of candidate ASR modules to which a user's uttered speech is input. As for the features of the user's uttered speech extracted by each of the predetermined number of candidate ASR modules included in the ASR module 182, the calculation module 185 can calculate the score by acquiring the probabilities for pronunciation information using an acoustic model (182_12a in FIG. 5) and pronunciation information using a language model (182-12b in FIG. 5). Here, the probability is output from the language model (182-12b in FIG. 5), and may indicate a probability of a connection relationship between words corresponding to pronunciation information output from an acoustic model (182_12a in FIG. 5).

In an alternative embodiment, the calculation module 185 may calculate the score by combining the correspondence probability and the placement probability from each of a predetermined number of candidate ASR modules included in the ASR module 182. The calculation module 185 can acquire the language-specific correspondence probability possessed by the uttered speech in accordance with the features of the uttered speech extracted from each of the plural ASR modules using the acoustic models. The calculation module 185 can acquire a placement probability at which respective words are placed at the corresponding position in words that are continued in the uttered speech using the language models.

The selection module 186 can select a candidate ASR module with the highest score as an optimized ASR module, among the scores calculated by the calculation module 185 from each of the predetermined number of candidate ASR modules. Here, the optimized ASR module may include a user's first language (native language) ASR module.

For example, assuming that the candidate ASR module set by the setting module 184 is English ASR module, French ASR module, Spanish ASR module, and Portuguese ASR module from the analysis result of user's video analyzed by the analysis module 183, the user's uttered speech can be input to English ASR module, French ASR module, Spanish ASR module and Portuguese ASR module, respectively. The output module 185 may calculate the score from English ASR module, French ASR module, Spanish ASR module, and Portuguese ASR module. The selection module 186 can select English ASR module with the highest score as the optimization ASR module, thereby making it possible to know that the user's first language (native language) uttering speech is English.

The providing module 187 can provide the processing result of the uttered speech recognized by the optimized ASR module as the communication information. For example, the providing module 187 can provide the processing result of the uttered speech recognized by English ASR module as English communication information. The providing module 187 may include a natural language understanding module 187-1, a natural language generation module 187-2, and a text-to-speech conversion module 187-3. The natural language understanding module 187-1 can perform a syntactic analysis or a semantic analysis on the text data output from the optimization ASR module to grasp the user's intention. Here, the syntactic analysis can divide the text into syntactic units (e.g., words, phrases, morphemes, etc.) to understood whether the divided units have any semantic elements. In addition, the semantic analysis can be performed using semantic matching, rule matching, formula matching, and the like. Thus, the natural language understanding module 187-1 can obtain a parameter required for the text to represent any of domain, intent or intention. The natural language generation module 187-2 can generate the user's intention understood by the natural language understanding module 187-1 as a text in a natural language form. The text-to-speech conversion module 187-3 can convert the text of the natural language speech form generated by the natural language generation module 187-2 into audio information and output it through the audio output unit 142. That is, the providing module 187 converts the user's intention recognition result of the language text data converted by the optimized ASR module (language ASR module) into a natural language text, and the converted natural language text can be converted into speech information and provided as communication information.

In this embodiment, the operation of one or more of the receiving module 181, the automatic speech recognition module 182, the analysis module 183, the setting module 184, the calculation module 185, the selecting module 186 and the providing module 187 may be performed in the communication robot 100 or in the server 300 depending on the processing capability.

In this embodiment, when the user approaches within a predetermined distance (adjacent area 101) from the communication robot 100 and the processing unit 180 receives the uttered speech corresponding to a service request from the user, the processing unit 180 can process the recognition result of the user's uttered speech using the ASR module 182, the calculation module 185 and the selection module 186. In an alternative embodiment, in order to process the user's language judgement more quickly, the processing unit 180 can predict a language group of the user through the analysis module 183 and the setting module 184 before receiving an uttering voice corresponding to a service request from the user, and then process recognition results of the user's uttered speech using the ASR module 182, the calculation module 185, and the selection module 186. In an alternative embodiment, when two or more optimized ASR modules come out while narrowing the ASR candidate group, that is, when an ASR module having the same score occurs, for example, when the score of the Spanish ASR module is the same as the score of the Portuguese ASR module, the processing unit 180 may provide information to select one of the two ASR modules through the second display unit 141-2, thereby allowing the user to select the ASR module.

In an alternative embodiment, there may exist cases where the processing unit 180 makes a mistake in selecting the optimized ASR module, for example, where the user's language is Portuguese but French ASR module is selected. If the selection of the optimized ASR module is incorrect, it can be judged based on reaction information of the user for providing communication information. Here, reaction information can be judged based on the user's facial expression analyzed from the user's video input to a camera 121. In such a case, the processing unit 180 may display a world map through a second display unit 141-2 and reproduce animation information indicating that if one of the countries is selected, the corresponding language service can be provided, and thereby guiding the user to select user's preferred language. Upon receiving a country selection signal from the user, communication information can be provided after activating the language ASR module used in the related country.

Figure 5:
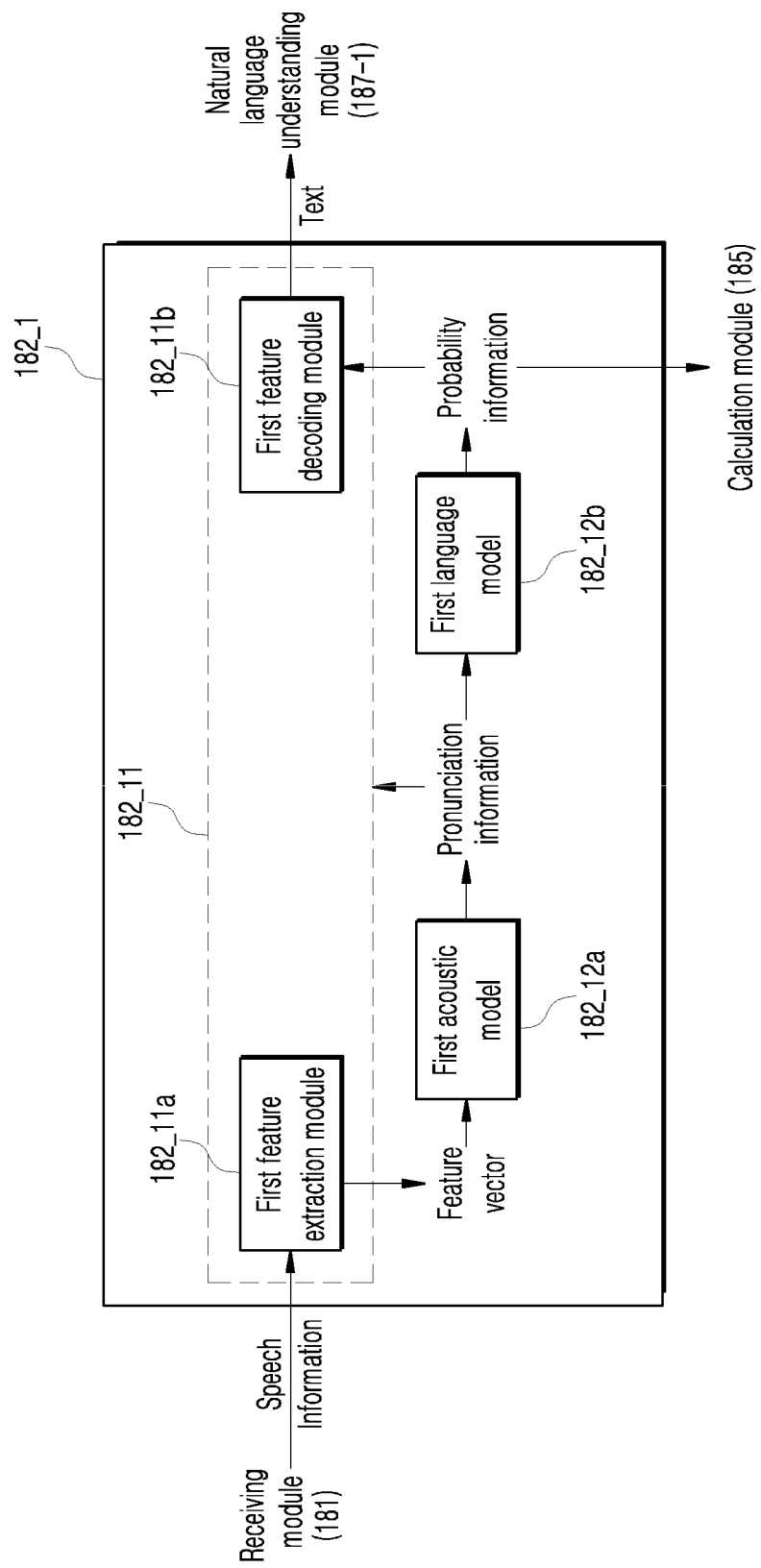
FIG. 5 is a schematic block diagram of the automatic speech recognition module in FIG. 4.

FIG. 5 is a schematic block diagram of the automatic speech recognition module in FIG. 4. In the following description, a repeated description of portions identical to those described above with reference to FIGS. 1 to 4 will be omitted. Referring to FIG. 5, each of the ASR modules 182_1 to 182_N includes an ASR engine and an ASR DB. For the convenience of description, the configuration of a first ASR module 182_1 will be described. Thus, the first ASR module 182_1 may include a first ASR engine 182_11 and a first ASR DB 182_12. The first ASR engine 182_11 may include a first feature extraction module 182_11a and a first decoding module 182_11b, and the first ASR DB 182_12 may include a first acoustic model 182_12a and a second language model 182_12b.

The first feature extraction module 182_11a can extract a feature vector for the user's uttered speech received by the receiving module 181. The first feature extraction module 182_11a may divide the user's uttering speech into specific frame sections and acquire information for each frequency band in each frame. Information for each frequency band may include energy distribution in each frequency band, and so on. Information for each frequency band of each frame can be digitized, and the feature vector can be obtained from the digitized information. In an alternative embodiment, when the user's uttered speech is divided, the first feature extraction module 182_11a may cluster and divide the uttered speech for each section having similar properties using a Gaussian mixture model. Because it is clustered into sections with similar properties, the first feature extraction module 182_11*a* can extract feature vectors that are more suitable for applying the first acoustic model (182_12*a*).

The first acoustic model 182-12*a* may acquire pronunciation information from the feature vector. Pronunciation information can include a plurality of pronunciations, and the pronunciation can include a phoneme or a sub-phoneme. For example, the first acoustic model 182_12*a* may include a hidden Markov model, a neural network, or the like. For example, when the first acoustic model 182_12*a* is a hidden Markov model, the hidden state may include a plurality of speech section states or information about transitions between plural speech section states. For example, if the acoustic model 323 is a neural network, the hidden state may include a parameter or a result value of the hidden layer of the neural network.

The first language model 182_12*b* can generate a probability from the pronunciation information. The first language model 182_12*b* can generate the probability for a connection relationship between words corresponding to pronunciation information taking into consideration the probability of words that can be placed before and after a specific word. The first language model 182_12*b* may generate a hidden state in the course of generating the probability. The hidden state may refer to a parameter or a result value within the first language model 182_12*b*. The hidden state may include information corresponding to the type of the first language model 182_12*b*. For example, the parameters may include parameters within the n-GRAM model or parameters or results of the hidden layer of the neural network.

The first decoding module 182_11*b* can calculate the overall probability from the probability, select the probability with the highest probability, and obtain text data from the probability with the highest probability.

In this embodiment, the probability transmitted to the calculation module 185 may include a probability of a connection relationship between characters corresponding to pronunciation information output from the first language model 182_12*b*, or a probability with the highest probability output from the first decoding module 182_11*b*.

In an alternative embodiment, the probability transmitted to the calculation module 185 may include a correspondence probability and a placement probability calculated by each of a predetermined number of candidate ASR modules included in the ASR module 182.

The calculation module 185 can acquire a language-specific correspondence probability possessed by the uttered speech in accordance with the features of the uttered speech extracted from each of the plurality of candidate ASR modules using the acoustic model provided in each of the candidate ASR modules. For example, if the candidate ASR module is an English ASR module, a French ASR module, a Spanish ASR module, and a Portuguese ASR module, and the language of the user uttered speech is English, among an English acoustic model provided in the English ASR module, a French acoustic model provided in the French ASR module, a Spanish acoustic model provided in the Spanish ASR module, and a Portuguese acoustic model provided in the Portuguese ASR module, the highest correspondence probability can be obtained from the English acoustic model depending on the features of the English uttering speech. This can be attributed to the difference between the features of the uttering voice for each language, for example, the feature frequencies corresponding to the pronunciation and/or the intonation.

The calculation module 185 can acquire a placement probability at which the respective words are placed at the corresponding positions in words that are continued in the uttered speech using the language model provided in each of the candidate ASR modules. For example, if the candidate ASR module is an English ASR module, a French ASR module, a Spanish ASR module, and a Portuguese ASR module, and the language of the user's uttered speech is English, among an English language model provided in the English ASR module, a French language model provided in the French ASR module, a Spanish language model provided in the Spanish ASR module, and a Portuguese language model provided in the Portuguese ASR module, the highest placement probability can be obtained from the English language model according to the placement of words corresponding to the syntactic structure of English. This is attributed to the fact that since each language has different syntactic structures, the placement relationship (connection relationship) of words may be different from each another.

FIG. 6 is schematic diagrams illustrating the probability generated by an automatic speech recognition module according to an exemplary embodiment of the present disclosure. In the following description, a repeated description of portions identical to those described above with reference to FIGS. 1 to 5 will be omitted.

FIG. 6A illustrates a result of which the first language model 182_12*b* calculated the probability of a word connecting relationship corresponding to the pronunciation information, using the pronunciation information output from the first acoustic model 182_12*a* in which the first language model 182_12 *b* is an English language model and an English acoustic model. From FIG. 6A, for example, if the user's uttered speech is "where is duty free shop", the pronunciation information output from the first acoustic model 182_12*a* may be "wer iz dju ti fri ʃap", and the first language model 182_12*b* as an English language model can calculate, for example, the probability that the word 'where' appears and the probability that the word 'is' appears after the word 'where'.

FIG. 6B illustrates a result of calculating the probability of a word connecting relationship corresponding to the pronunciation information from the first language model 182_12*b*, by using pronunciation information output from the first acoustic model 182_12*a* in which the first language model 182_12 *b* is a Korean language model and a Korean acoustic model. From FIG. 6B, for example, if the user's uttered speech is "where is duty free shop", pronunciation information output from a first acoustic model 182_12*a* may be "웨어 이즈 실라 듀티 프리 숍", and the first language model 182_12*b* as an Korean language model can calculate, for example, the probability that the word '웨어' appears and the probability that the word '이즈' appears after the word 'where'. In terms of the Korean language model, the word "웨어" is a word that is not aware of from the word, so the probability can be low. Korean contain a lot of foreign languages, so the probability that word 'is' appears after the word 'where' may be higher.

The basic method of the first language model 182_12*b* can calculate the probability based on whether the corresponding word can appear and whether a combination of words that precede and follow is possible based on the word. The scores that are the sum of the probability calculation results of FIGS. 6A and 6B will be higher in English language model. Therefore, the English ASR module among the first ASR module 182_1 to the Nth ASR module 182_N can be selected as the optimized ASR module, and subsequent communication information can be provided in English.

Figure 7:
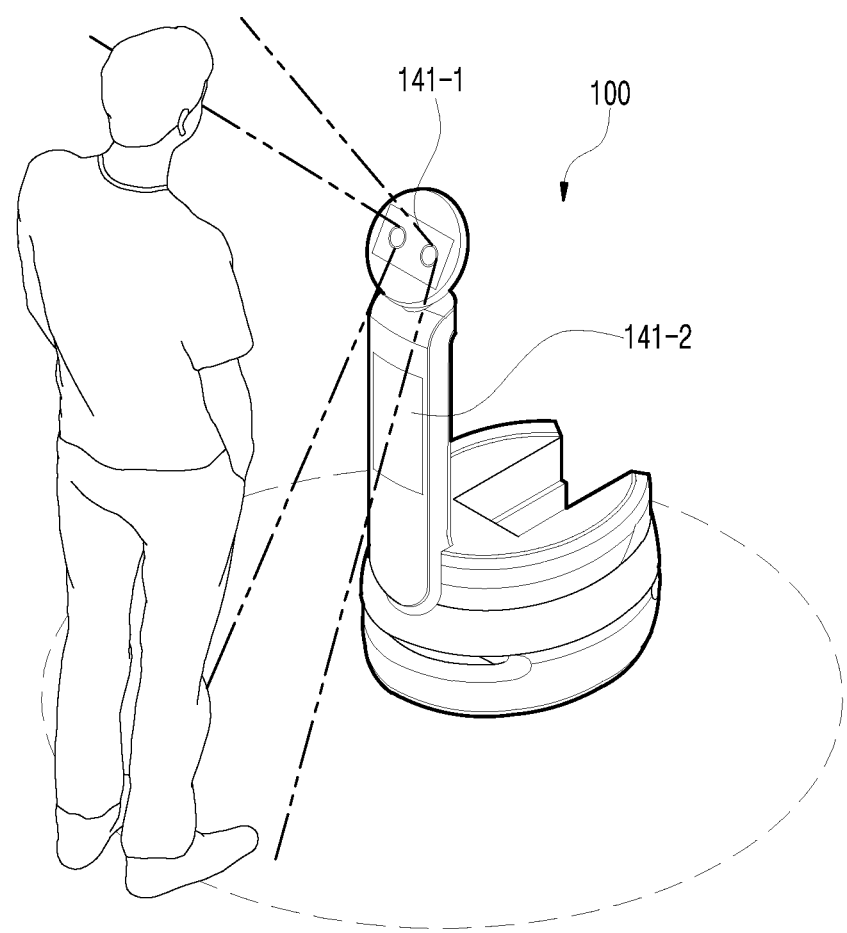
FIG. 7 is an exemplary view in which a communication robot acquires a user's video according to an exemplary embodiment of the present disclosure.

FIG. 7 is an exemplary view in which a communication robot acquires a user's video according to an exemplary embodiment of the present disclosure. In the following description, a repeated description of portions identical to those described above with reference to FIGS. 1 to 6 will be omitted. Referring to FIG. 7, when a user approaches within a predetermined distance (adjacent region 101) from the communication robot 100 in order to predict the user's language group, it shows generating a photographed video of a user and analyzing the photographed video of the user.

Figure 8:
FIG. 8 is an exemplary view showing a language speech communication between a communication robot and a user according to an exemplary embodiment of the present disclosure.

FIG. 8 is an exemplary view showing a language speech communication between a communication robot and a user according to an exemplary embodiment of the present disclosure. In the following description, a repeated description of portions identical to those described above with reference to FIGS. 1 to 7 will be omitted. Referring to FIG. 8, when the user approaches within a predetermined distance (adjacent area 101) from the communication robot 100 and the communication robot 100 receives an uttered speech (for example, where is Shilla Duty Free Shop) responding to a service request from the user, it is shown that the processing result of the uttered speech is provided as the communication information, that is, service response information (for example, customers, Shilla Duty Free Shop is in . . . ) via the speech recognition processing. Here, the communication robot 100 may receive a language uttering speech corresponding to a service request from a user, and may provide the processing result of the uttered speech as language communication information, that is, language service response information, through the speech recognition processing.

In an alternative embodiment, the communication robot 100 can set a language candidate group using the analysis result of user's video from FIG. 7, select the actual language based on the score from the language candidate group, and provide the processing result of the uttered speech as the communication information, that is, service response information, through the speech recognition processing of the actual language.

Figure 9:
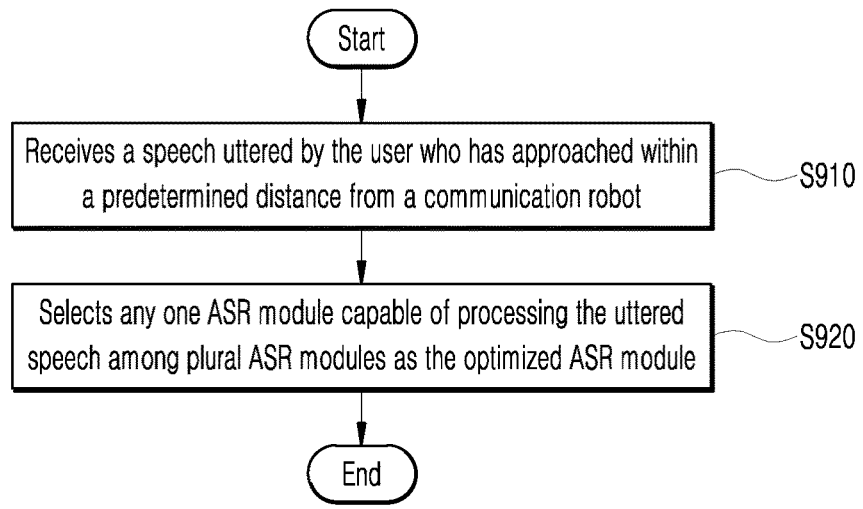
FIG. 9 is a flowchart of a method for driving a communication robot according to an exemplary embodiment of the present disclosure.

FIG. 9 is a flowchart of a method for driving a communication robot according to an exemplary embodiment of the present disclosure. In the following description, a repeated description of portions identical to those described above with reference to FIGS. 1 to 8 will be omitted.

Referring to FIG. 9, in step S910, the communication robot 100 receives a speech uttered by the user who has approached within a predetermined distance (adjacent area 101). Here, the utterance speech that the user utters may include all or some of continuous speeches excluding the wake-up-word speech. In addition, the utterance speech that the user utters may include a language uttering speech uttered by the user.

In step S920, the communication robot 100 selects any one ASR module capable of processing the uttered speech among plural ASR modules as the optimized ASR module. The communication robot 100 can provide the user's uttered speech to each of the plural ASR modules so that each of the plural ASR modules operates in parallel, and calculate the recognition result of the uttered speech of the user from each of the plural ASR modules as a score. The communication robot 100 can select one of the ASR modules with the highest score as the optimized ASR module. Here, the communication robot 100 can extract the features of the uttered speech from each of the plural ASR modules, acquire pronunciation information from a feature of a uttered speech using an acoustic model, acquire a probability of a connection relation between words corresponding to pronunciation information from pronunciation information using a language model, and then calculate the sum of the probability as a score. In an alternative embodiment, in response to the feature of the utterance speech extracted from each of the plural ASR modules, the communication robot 100 may calculate a language-specific matching score by combining a language-specific correspondence probability possessed by the uttered speech, and the placement probability at which respective words are placed at a corresponding position in words that are continued in the uttered speech. Subsequently, the communication robot 100 can provide the processing result of the user's uttered speech recognized by the optimized ASR module, that is, the user's language ASR module, as communication information, that is, service response information corresponding to the user's language.

Figure 10:
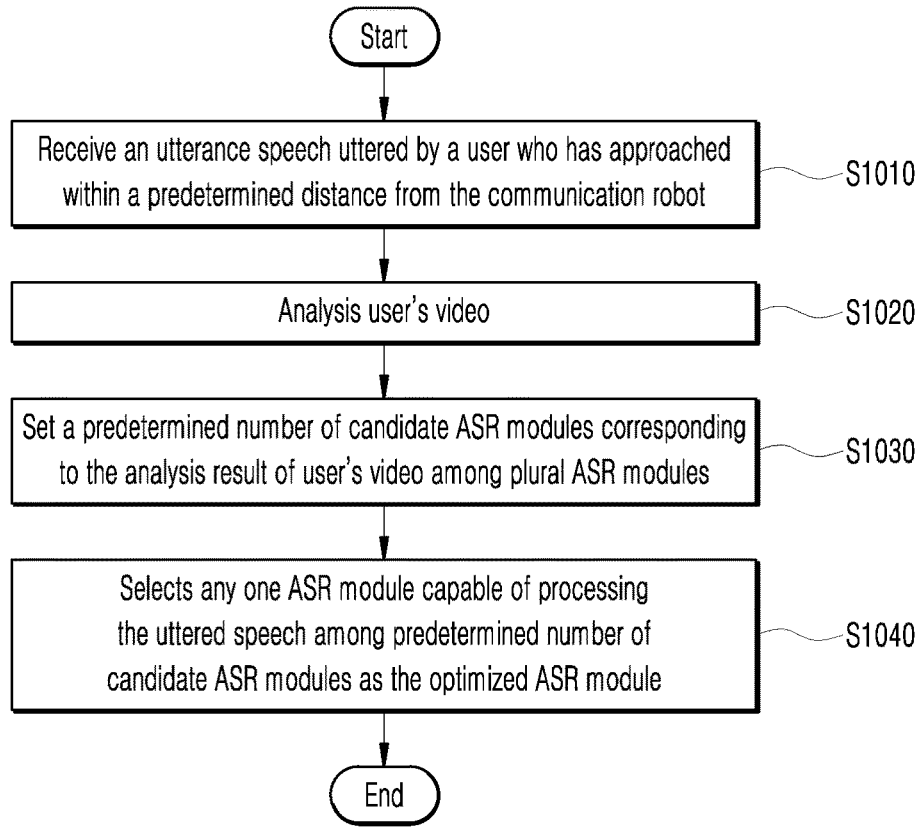
FIG. 10 is a flowchart of a method for driving a communication robot according to another exemplary embodiment of the present disclosure.

FIG. 10 is a flowchart of a method for driving a communication robot according to another exemplary embodiment of the present disclosure. In the following description, a repeated description of portions identical to those described above with reference to FIGS. 1 to 9 will be omitted.

Referring to FIG. 10, in step S1010, the communication robot 100 receives an image of a user who has approached within a predetermined distance (adjacent area 101).

In step S1020, the communication robot 100 analyzes a video of a user. The communication robot (100) can analyze the video of the user and generate race information of the user as a result of the analysis. The communication robot 100 can generate race information of the user using one or more of a morphological feature, a measurement feature, a facial index feature, and a cranial index feature from the user's video. The communication robot 100 can store reference values capable of classifying the user's race, compare the reference value with the user's video to generate the user's race and distribution area as an analysis result, and generate the user's language prediction result as an analysis result from the distribution area.

In step S1030, the communication robot 100 sets a predetermined number of candidate ASR modules corresponding to the analysis result of user's video among the plural ASR modules. For example, if the analysis result of user's video of the analysis module 183 is Caucasian, a predetermined number of candidate ASR modules (e.g., an English ASR module, a French ASR module, a Spanish ASR module, a Portuguese ASR module, etc.) can be set, considering that the distribution area is throughout Europe, North Africa, Arabian Peninsula, Afghanistan, North India, and North and South America.

In step S1040, the communication robot 100 sets a predetermined number of candidate ASR modules, and then receives an utterance speech uttered by a user who has approached within a predetermined distance (adjacent area 101). Here, the utterance speech uttered by the user may include all or some of continuous speeches excluding wake-up-word speeches. In addition, the utterance speech that the user utters may include a language uttering speech of the user.

In step S1050, the communication robot 100 selects one candidate ASR module capable of processing the uttered speech among a predetermined number of candidate ASR modules as the optimized ASR module. The communication robot 100 provides a user's uttered speech to each of a predetermined number of candidate ASR modules, so that each of the predetermined number of candidate ASR modules operates in parallel, and calculate the recognition results of the user's uttered speech from each of the predetermined number of candidate ASR modules as a score. The communication robot 100 can select one candidate ASR module having the highest score as the optimized ASR module. Subsequently, the communication robot 100 can provide the processing result of the user's uttered speech recognized by the optimized ASR module, that is, the user's language ASR module, as communication information, that is, service response information corresponding to the user's language.

Embodiments according to the present disclosure as described above can be implemented in the form of a computer program that can be executed via various components on a computer, and such a computer program may be recorded on a computer-readable medium. At this time, the medium may include a magnetic media such as a hard disk, a floppy disk, and a magnetic tape, an optical recording medium such as a CD-ROM and DVD, a magneto-optical medium such as a floptical disk, and a hardware device specifically configured to store and execute program instructions, such as a ROM, a RAM, a flash memory, and the like.

On the other hand, the computer program may be specially designed and configured for the present invention or known and available to those skilled in the field of computer software.

Examples of the computer program include not only machine language codes created by a compiler or the like, but also high-level language codes that can be executed by a computer using an interpreter or the like The term "said" or other indicating terms similar thereto used in the detailed descriptions (in particular, the claims) may include both a singular form and a plural form. In addition, the description of a range may include individual values falling within the range (unless otherwise specified), and is the same as describing the individual values forming the range.

The steps constituting the method according to the present disclosure may be performed in appropriate order unless a specific order is described or otherwise specified. The inventive concept is not limited to the described order of the steps. All of the examples or exemplary terms (for example, etc.) are simply used to describe the technical idea in detail, and the range is not limited by the above-described examples or exemplary terms as long as they are not limited by the claims. In addition, a person skilled in the art can know that various modification, combinations, and changes are made according to a design condition or factor within the range of the attached claims or equivalents thereof.

Therefore, the scope of the present disclosure is defined not by the detailed description, but by the claims and their equivalents, and all variations within the scope of the claims and their equivalents are to be construed as being included in the present disclosure.

What is claimed is:

1. A method for driving a communication robot disposed at an arbitrary place comprising:
   receiving an utterance speech uttered by a user who has approached within a predetermined distance from the communication robot; and
   selecting any one ASR module capable of processing the uttered speech among plural ASR (auto speech recognition) modules as an optimized ASR module,
   wherein the method further comprises:
      receiving a video of a user who has approached within a predetermined distance from the communication robot before receiving the utterance speech uttered by the user;
      analyzing the video of the user; and
      setting a predetermined number of candidate ASR modules corresponding to the analysis result of user's video among the plural ASR modules.

2. The method according to claim 1,
   wherein the receiving includes receiving the whole of the utterance speech uttered by the user.

3. The method according to claim 1,
   wherein the receiving includes receiving a part of the whole of the utterance speech uttered by the user.

4. The method according to claim 1,
   wherein the receiving includes receiving a first language uttering speech uttered by the user.

5. The method according to claim 4,
   wherein the selecting step includes selecting a first language ASR module corresponding to a first language uttered by the user as the optimized ASR module among the plural ASR modules.

6. The method according to claim 1, further comprising:
   providing an uttered speech to each of the plural ASR modules; and
   calculating as a score a recognition result of the uttered speech from each of the plural ASR modules,
   wherein the selecting includes selecting any one ASR module with the highest score as the optimized ASR module.

7. The method according to claim 6,
   wherein the calculating comprises:
   acquiring a language-specific correspondence probability possessed by the uttered speech in accordance with the feature of the uttered speech extracted from each of the plural ASR modules using an acoustic model;
   acquiring a placement probability at which respective words are placed at a corresponding position in words that are continued in the uttered speech using a language model; and
   calculating a language-specific matching score by a combination of the correspondence probability and the placement probability.

8. The method according to claim 1,
   wherein the analyzing includes analyzing the user's race using one or more of a morphological feature, a measurement feature, a facial index feature, and a cranial index feature from the video of the user.

9. The method according to claim 1,
   wherein the selecting step includes selecting as an optimized ASR module any one ASR module capable of processing the uttered speech among a predetermined number of candidate ASR modules corresponding to the user's race.

10. A communication robot disposed at an arbitrary place, comprising:
    a receiving module which receives an utterance speech uttered by a user who has approached within a predetermined distance from the communication robot; and
    a processor which selects as an optimized ASR module any one ASR module capable of processing the uttered speech among plural ASR (auto speech recognition) modules,
    wherein the communication robot further comprises:
       an analysis module that receives and analyzes a video of a user who has approached within a predetermined distance from the communication robot before receiving the utterance speech uttered by the user; and a setting module that sets a predetermined number of candidate ASR modules among the plural ASR modules corresponding to an analysis result of the user's video.

11. The communication robot according to claim 10, wherein the receiving module receives the whole of the utterance speech uttered by the user.

12. The communication robot according to claim 10, wherein the receiving module receives a part of the whole of the utterance speech uttered by the user.

13. The communication robot according to claim 10, wherein the receiving module receives a first language uttering speech uttered by the user.

14. The communication robot according to claim 13, wherein the processor selects a first language ASR module corresponding to a first language uttered by the user as the optimized ASR module of the plural ASR modules.

15. The communication robot according to claim 10, further comprising a calculation module that provides the uttered speech to each of the plural ASR modules and calculates a recognition result of the uttered speech from each of the plural ASR modules as a score, wherein the processor selects any one ASR module with the highest score as the optimized ASR module.

16. The communication robot according to claim 15, the calculation module acquires a language-specific correspondence probability possessed by the uttered speech in accordance with the features of the uttered speech extracted from each of the plural ASR modules by using an acoustic model, acquire a placement probability at which each word is placed at the corresponding position in words that are continued in the uttered speech using a language model, and calculate a language-specific matching score by a combination of the correspondence probability and the placement probability.

17. The communication robot according to claim 10, wherein the analysis module analyzes the user's race using one or more of a morphological feature, a measurement feature, a facial index feature, and a cranial index feature from the video of the user.

18. The communication robot according to claim 17, wherein the processor selects as an optimized ASR module any one ASR module capable of processing an uttered speech among a predetermined number of candidate ASR modules corresponding to the user's race.

* * * * *

UNITED STATES PATENT AND TRADEMARK OFFICE
CERTIFICATE OF CORRECTION

PATENT NO. : 11,437,042 B2
APPLICATION NO. : 16/569233
DATED : September 6, 2022
INVENTOR(S) : Gyeong Hun Kim It is certified that error appears in the above-identified patent and that said Letters Patent is hereby corrected as shown below:

On the Title Page

Column 1, item [30], Line 2, delete "(WO)" and insert -- (KR) --.

Signed and Sealed this
Third Day of January, 2023

Katherine Kelly Vidal
*Director of the United States Patent and Trademark Office*